Nov. 6, 1951     F. NOVAK     2,573,771
AUTOMATIC RELEASE HITCH ASSEMBLY
Filed May 3, 1949
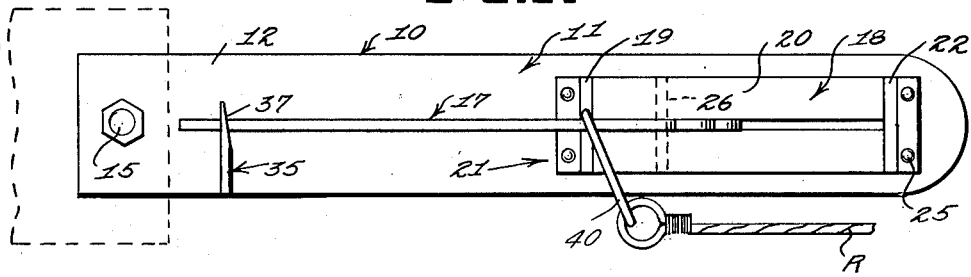
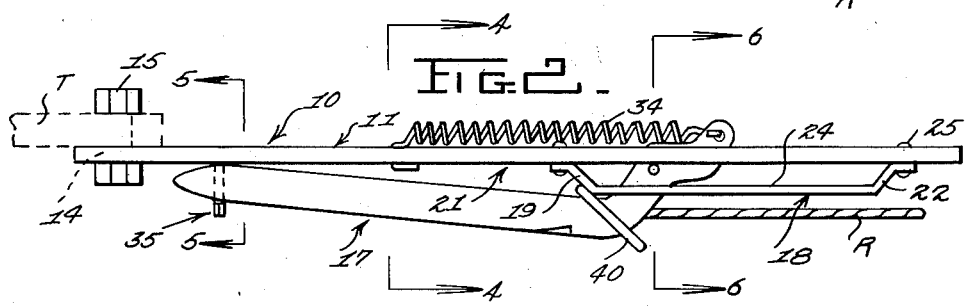
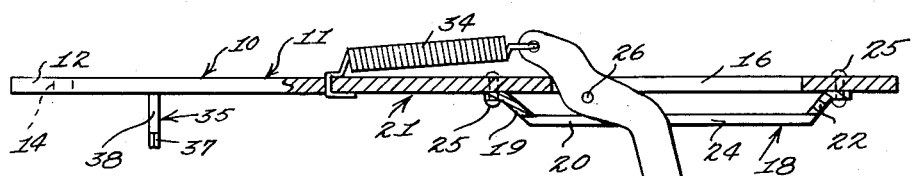
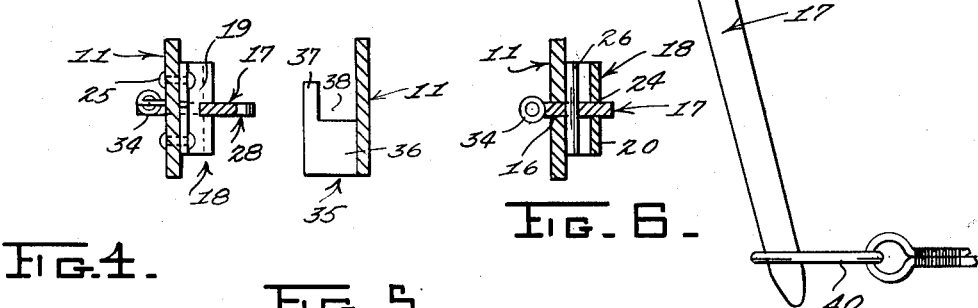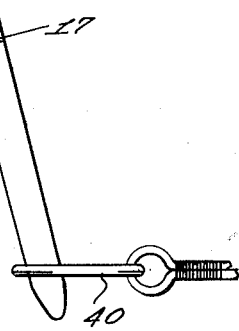
INVENTOR.
FRANK NOVAK
BY
McMorrow, Berman + Davidson
ATTORNEYS Patented Nov. 6, 1951

2,573,771

UNITED STATES PATENT OFFICE 2,573,771

AUTOMATIC RELEASE HITCH ASSEMBLY

Frank Novak, Hartford, Wis.

Application May 3, 1949, Serial No. 91,121

3 Claims. (Cl. 280—150)

This invention relates to an automatic release hitch, and more particularly to a spring-release hitch for detachably securing one end of a plow-controlling rope or cable to a tractor.

It is an object of this invention to provide a spring-pressed release hitch of the kind to be more particularly described hereinafter, which is small, compact, light in weight, and efficient for properly releasing a connection upon the application of a predetermined tension force.

A further object of this invention is to provide a trip rope hitch of this kind which is formed for efficient operation from a selected position, fixed on the tractor.

With the above and other objects in view, my invention consists in the arrangement, combination and details of construction disclosed in the drawings and specification, and then more particularly pointed out in the appended claims.

In the drawings:

Figure 1 is a side elevation of an improved releasable hitch constructed according to an embodiment of this invention;

Figure 2 is a top plan view thereof;

Figure 3 is a top plan view, partly broken away and partly in section, showing the release hitch in its open or extended position;

Figure 4 is a fragmentary transverse section taken on the line 4—4 of Figure 2;

Figure 5 is a fragmentary transverse section taken on the line 5—5 of Figure 2;

Figure 6 is a transverse section taken on the line 6—6 of Figure 2.

Referring to the drawings, the numeral 10 designates generally a novel releasable hitch constructed according to an embodiment of my invention. The releasable hitch 10 is particularly designed for fixed attachment to a tractor for connecting the trip rope of the plow or similar farm implement which is detachably drawn by the tractor. The trip rope R is adapted to be connected to the clutch or other plow-actuating member carried by the plow and to the hitch 10, fixed on the tractor. Upon disengagement of the plow or other implement from the tractor, as when the plow engages an obstruction in the ground and becomes detached from the tractor, the trip rope R will be released from the hitch 10 when a suitable force is exerted on the rope as the tractor moves away from the obstructed farm implement. The disengagement of the trip rope R from the hitch 10 will disengage the trip rope from the tractor, so that the trip rope will not damage any of the levers or other parts of the plow which have become disengaged.

The trip rope hitch 10 is formed of an elongated plate 11 which is adapted to be secured to the tractor, not shown in the drawings, at a suitable position whereby the trip rope R may be actuated by the operator as desired. The forward or one end 12 of the flat plate 11 is provided with an aperture 14 through which a bolt 15 is adapted to be engaged for securing the hitch 10 to the tractor. The bolt 15 is adapted to be engaged through a suitable fixed support T carried by the tractor adjacent the operator or within easy reach, so that the operator may actuate the trip rope R for raising and lowering the plows as desired.

The plate 11 extends rearwardly from its connection to the tractor T and is formed with an elongated slot 16 adjacent the rear end thereof. The slot 16 is positioned for extending longitudinally of the plate 11 adjacent the rear end thereof and forms a part of a guide means 21 for rockably and slidably supporting a trip-rope-engaging lever 17. The guide means 21 embodies a second plate 18 having a longitudinal slot 24 therein, which is arranged adjacent one face of plate 11 inwardly of and spaced from the other end of the plate 11. The forward end 19 of the plate 18 is inclined forwardly from the center panel 20 thereof which is positioned outwardly from the plate 11 in spaced relation thereto. The forwardly and inwardly-inclined end 19 forms a beveled edge inclined outwardly and rearwardly relative to the plate 18. The rear end 22 of the plate 18 is inclined rearwardly and inwardly for connecting the rear end of the plate 18 to the rear end of the plate 11. The intermediate part 20 of the plate 18 is formed with a longitudinally-extending slot 24 therein which is adapted to be positioned in transverse alignment with the slot 16 for purposes to be hereinafter described. The front and rear ends of the outwardly-spaced plate 18 are secured to the base plate 11 by rivets 25 or other suitable fastening devices for securely fastening the plate 18 to the rear end of the plate 11 with the slot 24 in transverse alignment on a horizontal plane with the longitudinally-extending slot 16.

A lever 17 is arranged longitudinally of and in substantially parallel relation with respect to the plate 11 and is connected adjacent one end thereof to a guide means or plate 18 for longitudinal sliding movement and swinging movement about an axis transverse of the plate 11 from the position substantially parallel to the plate to a position transverse of the plate 11. The other end of the lever 17 is adapted to removably receive a ring 40 carried by an end of a trip rope R. A transversely disposed pin 26 is fixedly carried by the lever 17 adjacent to and spaced from said one end thereof and is positioned between the plate 18 and plate 11, said pin constituting an axis transverse of the plate 11 about which the lever 17 is swung from the position substantially parallel to the plate 11 to a position transversely of the latter named plate. It is to be noted that the lever 17 extends freely through the slots 16 and 24 in the plates 11 and 18 respectively. In this manner the lever 17 is pivotally and slidably carried by the guide means 21 for longitudinal sliding movement and transverse pivotal movement.

A spring 34 is engaged at one end to the other or outer end of the lever arm 28 on one side of the base plate 11 and the other end of the spring 34 is engaged through the base plate 11 forwardly of the guide means 21, that is, forwardly of the engagement of the outwardly-offset plate 18 with the base plate 11. The spring 34 normally tensions the lever 17 to a forward position in the guide means 21 and to an open or outwardly-extending position as clearly shown in Figure 3 of the drawings.

A locking element or hook 35 is fixed on the forward end of the base plate 11 and extends outwardly from one side thereof, the same side as the outwardly-offset plate 18. The hook 35 is formed of a flat sheet of metal which may be fixed to or formed from the base plate 11 and positioned for engagement with the outer or other end of the lever 17. The hook 35 is formed with an outwardly-extending shank or bight portion 36 which is fixed at one end to the base plate 11 and an upwardly-extending lug or barb 37 spaced outwardly from the base plate 11 defining a substantial seat 38 therebetween.

In the use and operation of the trip-rope-hitch assembly 10, the ring 40 which is ordinarily carried by the free end of the trip rope R is initially engaged over the free end of the lever 17 by disengaging the lever 17 from the hook 35 to the outwardly-extending pivoted position shown in Figure 3. The hook 40 is slid up to a position adjacent the guide means 21 and the lever 17 is then swung about the pivots 26 and engaged in the seat 38 of the hook 35. The spring 34 will then bias the lever 17 to a forward position in the guide means 21 for positioning the lever 17 in locking engagement with the locking element or hook 35. The hitch 10 will remain in this locked or closed position during the normal operation of the tractor and plow being drawn thereby. When the plow engages an obstruction which is sufficient to break the connection between the plow and the tractor, a tension will be exerted on the trip rope R for sliding the ring 40 rearwardly along the length of the lever 17 where the ring 40 will slide up the inclined edge or side 19 for biasing the lever 17 rearwardly in the guide means 21. The force exerted on the rope R must exceed the tension of the spring 34 for sliding the lever 17 rearwardly in the slots 16 and 24 for disengaging the lever 17 from the hook 35 by sliding the lever 17 rearwardly out of the seat 38. After the lever 17 has been initially disengaged from the locking element 35, the spring 34, thus tensioned by the rearward sliding of the lever 17, will bias the other end of the lever 17 to a forwardly-extending position, as clearly shown in Figure 3 of the drawings, with the one end of the lever 17 in an outwardly and rearwardly-extending position, as clearly shown in Figure 3 of the drawings. From the outer or open position of the lever 17, the ring 40 is free to slide rearwardly and off from the lever 17 and out of engagement with the hitch 10, thereby disengaging the tractor from the plow and preventing any injury or damage to the plow lever mechanism, usually mounted on plows of this type.

I do not mean to confine myself to the exact details of construction herein disclosed, but claim all variations falling within the purview of the appended claims.

I claim:

1. A releasable hitch for securing a trip rope to a tractor plow or similar farm implement to a tractor comprising a base plate formed with a longitudinal slot therein, a second plate overlying the rear end of said base plate spaced outwardly therefrom, said second plate having a longitudinal slot in registry with the slot of said base plate, a lever slidably and pivotally engaged in said slots, a pivot pin fixed on said lever slidable between said slots, a latch on said base plate forwardly of said slot, one end of said lever being slidably engaged in said latch in the closed forward position thereof, and spring means engaging the other end of said lever biasing said lever to a forward closed position and an outwardly-extending open position after initial disengagement from said latch.

2. A releasable hitch for securing a trip rope of a farm implement to a tractor comprising a plate having one end adapted for connection to the tractor, a longitudinally extending guide means arranged adjacent one face of said plate inwardly of and spaced from the other end thereof and fixedly secured thereto, a lever arranged longitudinally of and in substantially parallel relation with respect to said plate and connected adjacent one end thereof to said guide means for longitudinal sliding movement and movement about an axis transversely of the plate from the position substantially parallel to said plate to a position transversely of said plate, the other end of said lever being adapted to removably receive a trip rope, spring means operatively connected to said one end of said lever and said plate for urging said lever to its position transversely of said plate, and a locking element on said one face of said plate and spaced from said guide means for embracingly receiving said other end of said lever to thereby hold said lever in its position parallel to said plate.

3. A releasable hitch for securing a trip rope of a farm implement to a tractor comprising a plate having one end adapted for connection to the tractor, a longitudinally extending guide means arranged adjacent one face of said plate inwardly of and spaced from the other end thereof and fixedly secured thereto, a lever arranged longitudinally of and in substantially parallel relation with respect to said plate, pivot means extending transversely of and on said lever adjacent one end thereof connected to said guide means for longitudinal sliding movement and swinging movement about said pivot means as an axis from the position substantially parallel to said plate to a position transversely of said plate, the other end of said lever being adapted to removably receive a trip rope, spring means operatively connected to said one end of said lever and said plate for urging said lever to its position transversely of said plate, and a locking element on said one face of said plate and spaced from said guide means for embracingly receiving said other end of said lever to thereby hold said lever in its position parallel to said plate.

FRANK NOVAK.

REFERENCES CITED

The following references are of record in the file of this patent:

UNITED STATES PATENTS

| Number | Name | Date |
|---|---|---|
| 1,384,195 | Hulsebos et al. | July 12, 1921 |
| 1,786,314 | Passmel | Dec. 23, 1930 |
| 2,478,124 | Mussman | Aug. 2, 1949 |